United States Patent
Lutzke

(10) Patent No.: US 7,618,069 B2
(45) Date of Patent: *Nov. 17, 2009

(54) SECONDARY RETENTION CLIP FOR FLUID TUBE CONNECTION

(75) Inventor: Matthew David Lutzke, Fenton, MI (US)

(73) Assignee: Cooper-Standard Automotive, Inc., Novi, MI (US)

( * ) Notice: Subject to any disclaimer, the term of this patent is extended or adjusted under 35 U.S.C. 154(b) by 999 days.

This patent is subject to a terminal disclaimer.

(21) Appl. No.: 10/980,087

(22) Filed: Nov. 3, 2004

(65) Prior Publication Data

US 2005/0062287 A1    Mar. 24, 2005

Related U.S. Application Data

(63) Continuation of application No. 10/288,754, filed on Nov. 6, 2002, now Pat. No. 6,851,725.

(60) Provisional application No. 60/331,798, filed on Nov. 20, 2001.

(51) Int. Cl.
*F16L 37/00* (2006.01)

(52) U.S. Cl. ...................... 285/305; 285/921

(58) Field of Classification Search ............... 285/305, 285/308, 403, 82, 320, 921, 311, 312, 93, 285/319

See application file for complete search history.

(56) References Cited

U.S. PATENT DOCUMENTS

| | | | |
|---|---|---|---|
| 1,384,332 A * | 7/1921 | Mullenux | 285/320 |
| 1,436,882 A | 11/1922 | Knepper | |
| 3,680,893 A * | 8/1972 | Giraud | 285/39 |
| 3,695,635 A * | 10/1972 | Paddington | 285/38 |
| 3,711,125 A * | 1/1973 | Dehar | 285/111 |
| 3,881,753 A * | 5/1975 | Bochory | 285/82 |
| 4,068,870 A * | 1/1978 | Whitney et al. | 285/320 |
| 4,214,728 A * | 7/1980 | Fleischer | 251/149.2 |
| 4,230,109 A * | 10/1980 | Geiss | 604/533 |
| 4,333,505 A * | 6/1982 | Jones et al. | 141/383 |
| 4,392,836 A * | 7/1983 | Sugawara | 464/52 |
| 4,526,411 A * | 7/1985 | Bartholomew | 285/305 |
| 4,741,590 A * | 5/1988 | Caron | 385/60 |
| 4,826,486 A * | 5/1989 | Palsrok et al. | 604/174 |
| 5,110,161 A | 5/1992 | Bartholomew | |
| 5,248,306 A * | 9/1993 | Clark et al. | 604/537 |
| 5,395,140 A * | 3/1995 | Wiethorn | 285/93 |
| 5,423,775 A * | 6/1995 | Cannon | 604/533 |
| 5,607,193 A * | 3/1997 | Guest | 285/308 |

(Continued)

*Primary Examiner*—James M Hewitt
(74) *Attorney, Agent, or Firm*—Carlson, Gaskey & Olds

(57) ABSTRACT

A tube is insertable into a housing and secured by a collet connector. The tube has a first upset portion for actuating the collet and a second upset portion outwardly from the first upset portion. A retention clip has a first pair of arms which attach to a portion of the housing and a second pair of arms which attach to the tube outwardly of the second upset portion to further secure the tube within the housing. The end of each of the second pair of arms include a ramped surface. If the tube is not fully inserted within the housing before attaching clip, and thus the first upset portion has not fully actuated the collet, the ramps will cam along the second upset portion, thus pushing the tube into the housing and likewise the first upset portion through the collet.

9 Claims, 2 Drawing Sheets

U.S. PATENT DOCUMENTS

| | | | |
|---|---|---|---|
| 5,730,475 A * | 3/1998 | Kargula | 285/308 |
| 6,368,135 B1 * | 4/2002 | Ho | 439/321 |
| 6,375,231 B1 * | 4/2002 | Picha et al. | 285/114 |
| 6,557,903 B2 * | 5/2003 | Walker | 285/305 |
| 6,612,619 B2 * | 9/2003 | Wieder | 285/23 |
| 6,851,725 B2 * | 2/2005 | Lutzke | 285/305 |
| 6,863,314 B2 * | 3/2005 | Guest | 285/81 |

* cited by examiner

SECONDARY RETENTION CLIP FOR FLUID TUBE CONNECTION

This application is a continuation of Ser. No. 10/288,754, filed Nov. 6, 2002, and now U.S. Pat. No. 6,851,725, issued Feb. 8. 2005, which claims priority to U.S. provisional application Ser. No. 60/33 1,798 filed Nov. 20, 2001.

BACKGROUND OF THE INVENTION

This invention relates to fluid quick connect couplings utilized to retain one fluid conduit within another.

In a standard fluid quick connect assembly, a first tube has a bore which receives a quick connect coupling. A second tube is inserted into the bore, and generally an enlarged or upset portion on the second tube forces the quick connect coupling to a position that allows the second tube to move into the bore. Once the upset portion passes the quick connect coupling, the quick connect coupling moves back to a retention position at which it holds the second tube in the bore. One particularly successful type of fluid quick connect coupling is a collet connector, such as is shown in U.S. Pat. No. 5,730,475. While these couplings provide very good retention, it is desirable to provide additional retention to further secure the second tube in the first tube.

Prior art fluid quick connect couplings sometimes utilize clips to further secure the second tube into the first tube. These clips have generally been of the sort that have surfaces which snap around the upset portion, and often a second upset portion, to hold the second tube within the first tube. The present invention provides improvements to such retention clips.

SUMMARY OF THE INVENTION

In the present invention, an improved retention clip is utilized to secure a tube within a housing. The tube has a first upset portion which actuates a quick connect coupling, preferably of the sort disclosed in the above-referenced U.S. patent, to connect the tube and the housing. A retention clip includes a pair of tube legs and a pair of housing legs. The tube legs are forced onto the tube and the housing legs are forced onto a portion of the housing to connect the clip, thereby securing the tube within the housing. Angled ramps on the ends of the tube legs cam along am upset portion to force the first upset portion fully through the collet should the tube not be fully inserted into the housing before the clip is placed. Preferably, the legs can hold a second upset portion.

These and other features of this invention will be best understood from the following specification and drawings, the following of which is a brief description.

DESCRIPTION OF THE PREFERRED EMBODIMENTS

Figure 1:
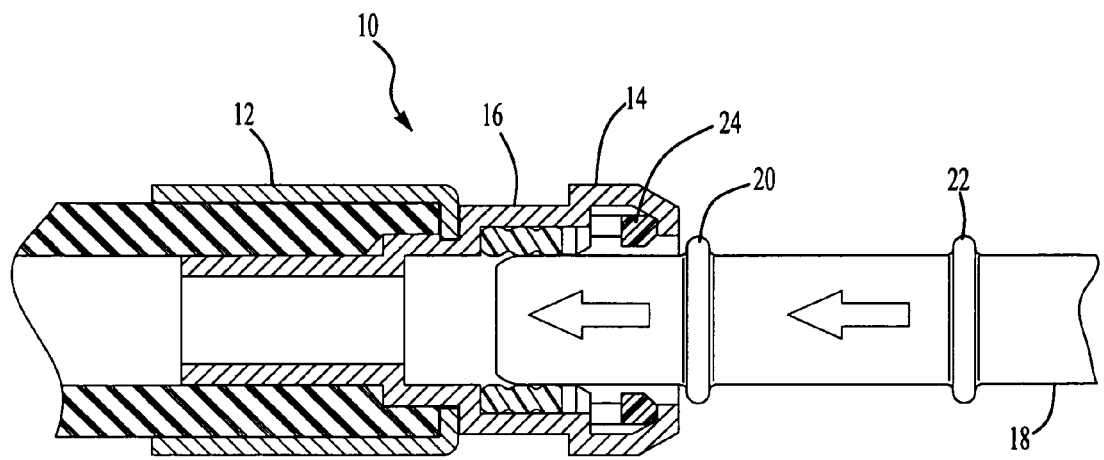
FIG. 1 shows a side view of a housing receiving a tube according to the present invention.

Referring to FIG. 1, a housing 10 includes two larger housing portions 12, 14 separated by a channel 16. A tube 18 has a first upset portion 20 and a second upset portion 22 outwardly of the first upset portion 20. The first upset portion 20 actuates a collet quick connect coupling 24 to fix the tube 18 within the housing 10. While the collet 24 is preferably of the sort disclosed in the above referenced U.S. patent, any suitable quick connect coupling may be utilized.

Figure 2:
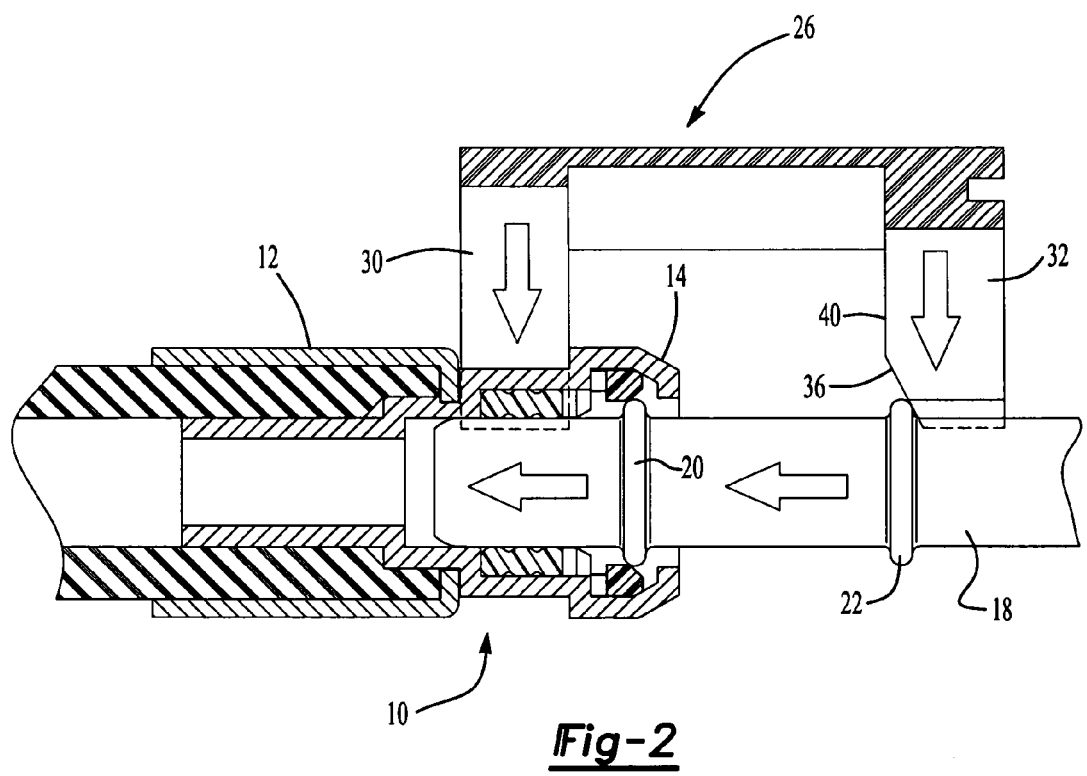
FIG. 2 shows a side view of a clip according to the present invention prior to connecting the clip to the housing or the tube.
Figure 3:
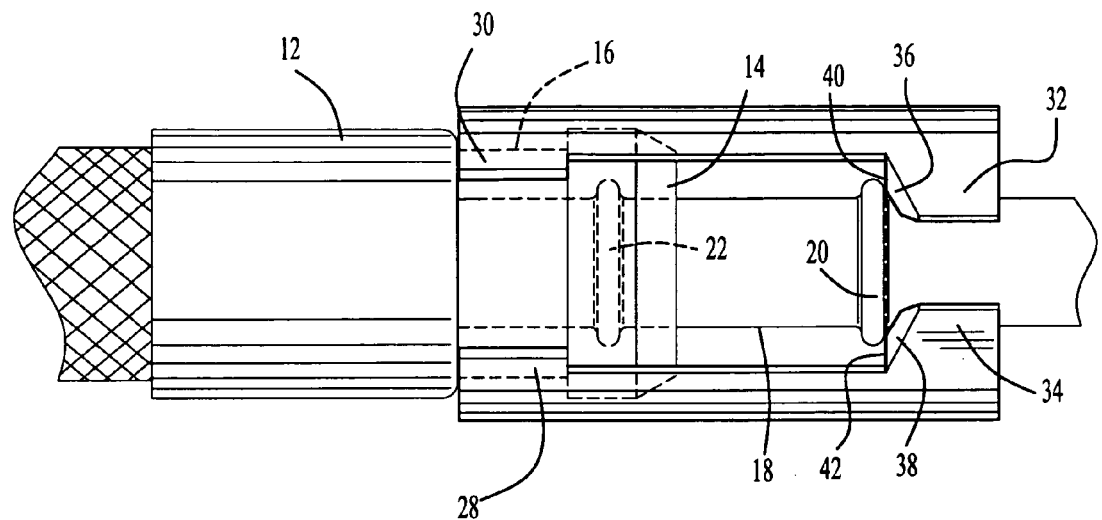
FIG. 3 shows a bottom view of the clip in FIG. 1 after connecting the clip to the housing and the tube.

Turning next to FIGS. 2 and 3, a retention clip 26 includes housing legs 28, 30 and tube legs 32, 34. The housing legs 28, 30 are received in the channel 16 to attach the clip 26 to that portion of the housing 10. The tube legs 32, 34 are similarly received on the tube 18 outwardly of the second upset portion 22 to hold the clip 26 on the tube 18 and hold the tube 18 in the housing 10. The clip 26 is preferably formed of plastic, and relatively robust and thick to provide solid retention of the tube within the housing.

During assembly, the tube 18 is inserted into the housing 10 (as was shown in FIG. 1), preferably until the first upset portion 20 of the tube 18 contacts the collet 24, thereby actuating the collet to fix the tube 18 within the housing 10. At times, the tube may not be fully inserted. The position shown in FIG. 2 is an example of such partial insertion.

To insure full insertion of the tube 18 within the housing 10, the clip 26 includes inventive ramps 36, 38 formed below generally flat portions 40, 42 on the inside of the ends of each of the tube legs 32, 34. The angled ramps 36, 38 are best shown in FIG. 3.

Figure 4:
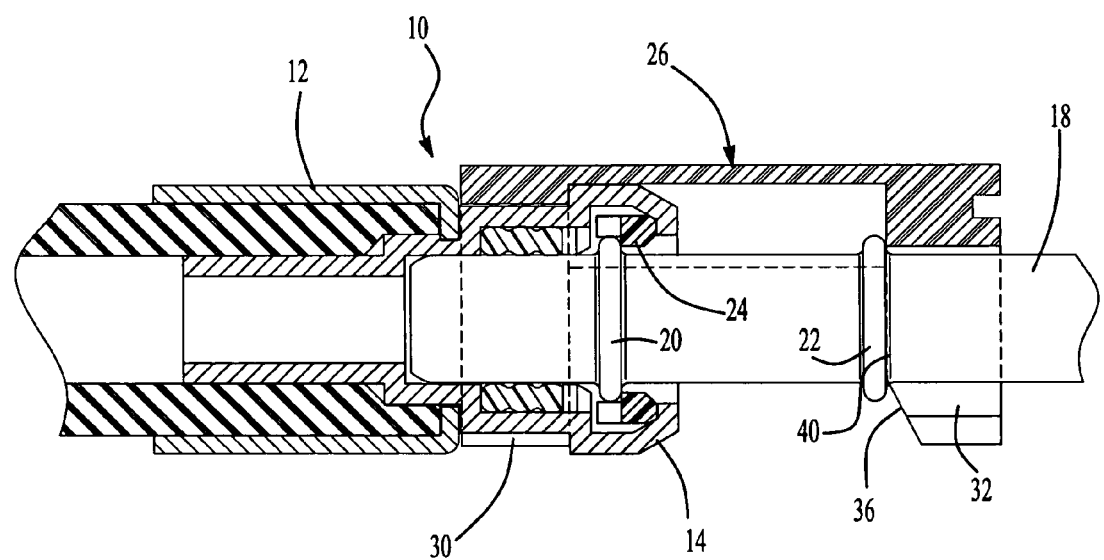
FIG. 4 shows a cut away view of the clip in FIG. 1 after connecting the clip to the housing and the tube.

The clip 26 is forced on the housing 10 and tube 18 after the tube is initially inserted. As is clear from the movement shown by the arrows in FIG. 2, both pairs of less 28, 30 and 32, 34 slide onto the housing and tube, respectively. Moreover, as can be appreciated, the angled surfaces 36 react against the portion 22, and cam the tube to the left as shown in FIG. 2. and as represented by the arrows. Thus, as shown in FIG. 2. if the first upset portion 20 is not fully inserted through the collet 24 when the clip 26 is being inserted onto connected housing 10 and tube 18, the ramps 36, 38 will cam along the second upset portion 22. This forces the tube 18 into the housing 10 and likewise force the first upset portion 20 fully through the collet 24. Thus, should assembly line personnel not fully insert the tube 18 within the housing 10, the clip 26 and its ramps 36, 38 will ensure that the tube 18 is properly inserted as the ramps 36, 38 move along the second upset portion 22. When the clip 26 is properly placed, the ramps 36, 38 will have moved past the second upset portion 22 such that the generally flat portions 40, 42 of the tube legs 32,34 arc aligned with the second upset portion 22 and the movement of the clip 26 has forced the tube 18 into the housing 10, as best shown in FIG. 4. If the tube is initially fully inserted, then clip 26 easily slides onto tube 18 without a cam surface needing to force the tube 18 further into housing 10.

While a preferred embodiment of this invention has been disclosed, a worker in this art would recognize that certain modifications would come within the scope of this invention. For that reason, the following claims should be studied to determine the true scope and content of this invention.

What is claimed is:

1. A retention assembly for a fluid tube connection, said assembly comprising:

a housing defining an axial bore;

a tube having at least a first upset portion, said tube insertable into said bore;

a quick connect coupling disposed within said bore, said coupling being actuated by said first upset portion of said tube to retain said tube within said bore; and a retention clip having at least one angled ramp such that said ramp will contact a surface on said tube as said clip is attached if said tube is not fully inserted within said housing, thereby forcing said tube into said housing and likewise said first upset portion through said coupling, said at least one angled ramp being at a remote end of a tube leg, such that said at least one ramp cams said surface into said housing, and then moves beyond said surface, such that a non-angled portion of said tube leg contacts said surface.

2. The assembly of claim 1 wherein there are two of said tube legs, forming a pair of tube legs, and a pair of housing legs for attaching said clip to said tube and a portion of said housing to further secure said tube within said bore.

3. The assembly of claim 2 wherein said at least one angled ramp is disposed on each of said pair of tube legs.

4. The assembly of claim 2 wherein said housing comprises a channel disposed between two larger housing portions.

5. The assembly of claim 4 wherein said housing legs are received by said channel for attaching said clip to said housing.

6. A retention assembly for a fluid tube connection, said assembly comprising:

a housing defining an axial bore;

a tube having a first upset portion and a second upset portion outwardly of said first upset portion, said tube insertable into said bore;

a quick connect coupling disposed within said bore, said coupling being actuated by said first upset portion of said tube to retain said tube within said bore; and a retention clip attached to said tube and a portion of said housing to further secure said tube within said bore, said clip including a ramp to contact said second upset portion as said clip is attached if said tube is not fully inserted within said housing, thereby forcing said tube into said housing and likewise said first upset portion through said coupling, said angled ramp being at a remote end of a tube leg, such that said angled ramp cams said second upset portion into said housing, and then moves beyond said second upset portion, such that a non-angled portion of said tube leg contacts said second upset portion.

7. The assembly of claim 6 wherein there are two of said tube legs, forming a pair of tube legs, and wherein said tube legs are received by said tube outwardly of said second upset portion to attach said clip to said tube.

8. The assembly of claim 7 wherein an end of both of said tube legs includes said ramp being angled.

9. The assembly of claim 6 wherein said housing comprises a channel disposed between two larger housing portions.

* * * * *